US008826643B2

(12) United States Patent
Yoshioka et al.

(10) Patent No.: US 8,826,643 B2
(45) Date of Patent: Sep. 9, 2014

(54) EXHAUST GAS PURIFYING DEVICE FOR INTERNAL COMBUSTION ENGINE

(75) Inventors: Mamoru Yoshioka, Susono (JP); Noriaki Kumagai, Susono (JP); Naoya Takagi, Mishima (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 121 days.

(21) Appl. No.: 13/509,723

(22) PCT Filed: Mar. 18, 2010

(86) PCT No.: PCT/JP2010/054650
§ 371 (c)(1),
(2), (4) Date: May 14, 2012

(87) PCT Pub. No.: WO2011/114482
PCT Pub. Date: Sep. 22, 2011

(65) Prior Publication Data
US 2012/0247090 A1     Oct. 4, 2012

(51) Int. Cl.
*F01N 3/00*     (2006.01)
*F01N 11/00*    (2006.01)
*F01N 3/20*     (2006.01)

(52) U.S. Cl.
CPC .............. *F01N 3/2013* (2013.01); *Y02T 10/26* (2013.01); *F01N 11/00* (2013.01); *F01N 2550/22* (2013.01); *F01N 3/2026* (2013.01); *F01N 2240/16* (2013.01)
USPC .................... 60/277; 60/286; 60/300; 60/303

(58) Field of Classification Search
USPC ............................ 60/284, 286, 300, 303, 277
See application file for complete search history.

(56) References Cited

U.S. PATENT DOCUMENTS

| 5,388,404 | A  | * | 2/1995  | Tsumura .......................... 60/284 |
| 5,555,725 | A  |   | 9/1996  | Shimasaki et al. |
| 5,758,492 | A  |   | 6/1998  | Kato et al. |
| 5,819,531 | A  | * | 10/1998 | Kato et al. ....................... 60/277 |
| 5,916,130 | A  | * | 6/1999  | Nakae et al. ..................... 60/276 |
| 5,994,787 | A  | * | 11/1999 | Hibino ......................... 307/10.1 |
| 6,185,931 | B1 | * | 2/2001  | Shimasaki et al. .............. 60/277 |
| 7,284,365 | B2 | * | 10/2007 | Abe ................................ 60/277 |
| 8,423,221 | B2 | * | 4/2013  | Watanabe ....................... 701/22 |
| 2009/0211233 | A1 |   | 8/2009  | Watanabe et al. |

FOREIGN PATENT DOCUMENTS

| JP | 08-061048 A | 3/1996 |
| JP | 08-074645 A | 3/1996 |
| JP | 09-158718 A | 6/1997 |
| JP | 2009-191681 A | 8/2009 |
| JP | 2009-196510 A | 9/2009 |

OTHER PUBLICATIONS

European Search Report issued Feb. 18, 2014 in European Patent Application No. 10847897.5.

\* cited by examiner

*Primary Examiner* — Binh Q Tran
(74) *Attorney, Agent, or Firm* — Sughrue Mion, PLLC

(57) ABSTRACT

The exhaust gas purifying device of an internal combustion engine includes: an electrically heated catalyst which is provided on an exhaust passage of the internal combustion engine, which purifies the exhaust gas drawn to the exhaust passage, and is warmed by electrification; and an electrification characteristic setting unit which set an electrification characteristic indicating a characteristic of an electrification resistance value in the electrically heated catalyst, in accordance with an electrification condition at a time of starting the electrification of the electrically heated catalyst. Thus, various determinations and controls relating to the electrically heated catalyst and using the electrification characteristic can be accurately performed.

5 Claims, 10 Drawing Sheets

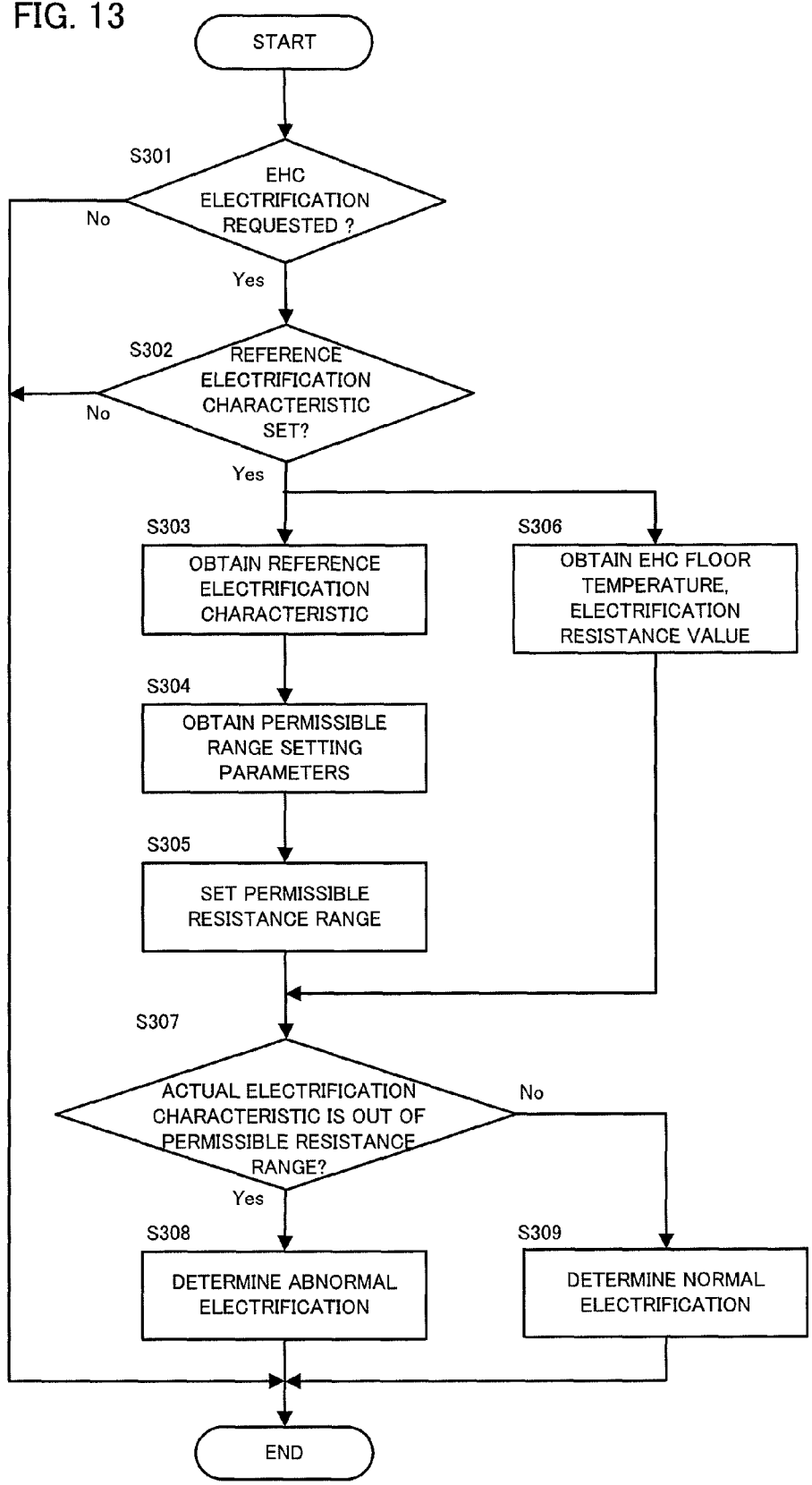

EXHAUST GAS PURIFYING DEVICE FOR INTERNAL COMBUSTION ENGINE

CROSS REFERENCE TO RELATED APPLICATIONS

This application is a National Stage of International Application No. PCT/JP2010/054650 filed Mar. 18, 2010, the contents of all of which are incorporated herein by reference in their entirety.

TECHNICAL FIELD

The present invention relates to an exhaust gas purifying device for an internal combustion engine having an electrically heated catalyst.

BACKGROUND TECHNIQUE conventionally, there is proposed a technique of purifying exhaust gas by using an electrically heated catalyst (hereinafter suitably referred to as "EHC") provided on an exhaust passage. For example, in Patent Reference-1, there is proposed a technique of determining an abnormality of an EHC by using a NTC (Negative Temperature Coefficient) characteristic showing that an electrification resistance value of a catalyst carrier varies dependently upon temperature variation of the catalyst carrier.

PRIOR ART REFERENCE

Patent Reference

Patent Reference-1: Japanese Patent Application Laid-open under No. 2009-191681

DISCLOSURE OF INVENTION

Problem to be Solved by the Invention

By the way, it is thought that the NTC characteristic of the EHC varies dependently upon an electrification condition at the time of starting the electrification of the EHC. Concretely, it is thought that the NTC characteristic is not uniquely determined because the temperature dispersion according to the electrification condition at the time of starting the electrification is caused inside the EHC. However, the technique disclosed in the above Patent Reference-1 does not consider such variation of the NTC characteristic of the EHC.

The present invention is made to solve the above-described problem, and its object is to provide an exhaust gas purifying device of an internal combustion engine capable of appropriately setting an electrification characteristic based on the electrification condition at the time of starting the electrification.

Means for Solving the Problem

According to one aspect of the present invention, there is provided an exhaust gas purifying device for an internal combustion engine, including: an electrically heated catalyst which is provided on an exhaust passage of the internal combustion engine, which purifies the exhaust gas drawn to the exhaust passage, and which is warmed by electrification; and an electrification characteristic setting unit which set an electrification characteristic indicating a characteristic of an electrification resistance value in the electrically heated catalyst, in accordance with an electrification condition at a time of starting the electrification of the electrically heated catalyst.

The exhaust gas purifying device for an internal combustion engine described above includes an electrically heated catalyst (EHC) which purifies the exhaust gas drawn to the exhaust passage and which is warmed by electrification. The electrification characteristic setting unit sets the electrification characteristic indicating a characteristic of an electrification resistance value in the electrically heated catalyst, in accordance with an electrification condition at a time of starting the electrification of the electrically heated catalyst. Here, the electrification characteristic tends to be affected by the electrification condition at the time of starting the electrification of the electrically heated catalyst. Concretely, the electrification characteristic tends to become different in accordance with the electrification condition at the time of starting the electrification, due to the temperature dispersion inside the EHC or else. Therefore, the electrification characteristic setting unit sets the electrification characteristic based on the electrification condition at the time of starting the electrification. Thus, various determinations and controls relating to the electrically heated catalyst and using the electrification characteristic can be accurately performed. For example, the determination of the abnormality of the electrically heated catalyst and the control of heating the electrically heated catalyst by the electrification can be accurately performed.

"The electrification characteristic" indicates the variation characteristic of the electrification resistance value of the electrically heated catalyst according to the condition when the electrically heated catalyst is electrified. In addition, "the electrification condition at the time of starting the electrification" is defined by the factor that affects the electrification characteristic of the electrically heated catalyst.

In one mode of the exhaust gas purifying device for an internal combustion engine described above, the electrification characteristic setting unit obtains an actual electrification resistance value of the electrically heated catalyst, and corrects the electrification characteristic when the actual electrification resistance value is lower than the electrification resistance value obtained from the electrification characteristic set in accordance with the electrification condition at the time of starting the electrification.

In this mode, the electrification characteristic setting unit corrects the electrification characteristic when the actual electrification resistance value is lower than the electrification resistance value obtained from the electrification characteristic. This is because, at the time of electrifying the electrically heated catalyst again for example, the temperature dispersion inside the electrically heated catalyst becomes large, and the actual electrification resistance value tends to become lower than the electrification resistance value obtained from the electrification characteristic. In this mode, the control of heating the electrically heated catalyst by the electrification can be accurately performed, and the temperature of the electrically heated catalyst can surely reach the target temperature.

Another mode of the exhaust gas purifying device for an internal combustion engine described above, further includes: a permissible resistance range setting unit which sets a permissible resistance range for determining an actual electrification characteristic of the electrically heated catalyst, based on the electrification characteristic set by the electrification characteristic setting unit; and an abnormal electrification determining unit which obtains the actual electrification characteristic of the electrically heated catalyst, and determines the abnormal electrification of the electrically heated catalyst when the actual electrification characteristic becomes out of the permissible resistance range, wherein the permissible resistance range setting unit sets the permissible resistance range in accordance with the electrification condition to the electrically heated catalyst at the time of starting the electrification.

In this mode, the permissible resistance range setting unit sets the permissible resistance range based on the electrification characteristic, and the abnormal electrification determining unit determines the abnormal electrification of the electrically heated catalyst when the actual electrification characteristic deviates from the permissible resistance range. Specifically, the permissible resistance range setting unit sets the permissible resistance range in accordance with the electrification condition at the time of starting the electrification of the electrically heated catalyst. This is because, since the temperature dispersion inside the electrically heated catalyst becomes large according to the electrification condition at the time of starting the electrification, the electrification resistance value of relatively low value tends to be obtained. In that case, the permissible resistance range setting unit sets the permissible resistance range to the low resistance side. Thus, the abnormal electrification of the electrically heated catalyst can be accurately determined.

Preferably, the above exhaust gas purifying device for an internal combustion engine further includes a unit which sets the electrification resistance value for determining whether or not the electrically heated catalyst reaches a target temperature, based on the electrification characteristic set by the electrification characteristic setting unit. Thus, the completion of the electrification of the electrically heated catalyst can be accurately performed.

In a preferred example, in the above exhaust gas purifying device for an internal combustion engine, at least one of temperature of the electrically heated catalyst at the time of starting the electrification, supplied power to the electrically heated catalyst at the time of starting the electrification and temperature dispersion inside the electrically heated catalyst at the time of starting the electrification is used as the electrification condition at the time of starting the electrification. This is because, the temperature of the electrically heated catalyst at the time of starting the electrification, the supplied power to the electrically heated catalyst at the time of starting the electrification and the temperature dispersion inside the electrically heated catalyst at the time of starting the electrification affect the electrification characteristic of the electrically heated catalyst.

In a preferred example, in the above exhaust gas purifying device for an internal combustion engine, the electrification characteristic is expressed by a relation of any one of the temperature of the electrically heated catalyst, supplied energy to the electrically heated catalyst and an electrification time to the electrically heated catalyst, with respect to the electrification resistance value.

BRIEF DESCRIPTION OF THE DRAWINGS

FIG. 13 is a flowchart showing the process in the third embodiment.

DETAILED DESCRIPTION OF THE PREFERRED EMBODIMENTS

Preferred embodiments of the present invention will be explained hereinafter with reference to the drawings.

[Device Configuration]

Figure 1:
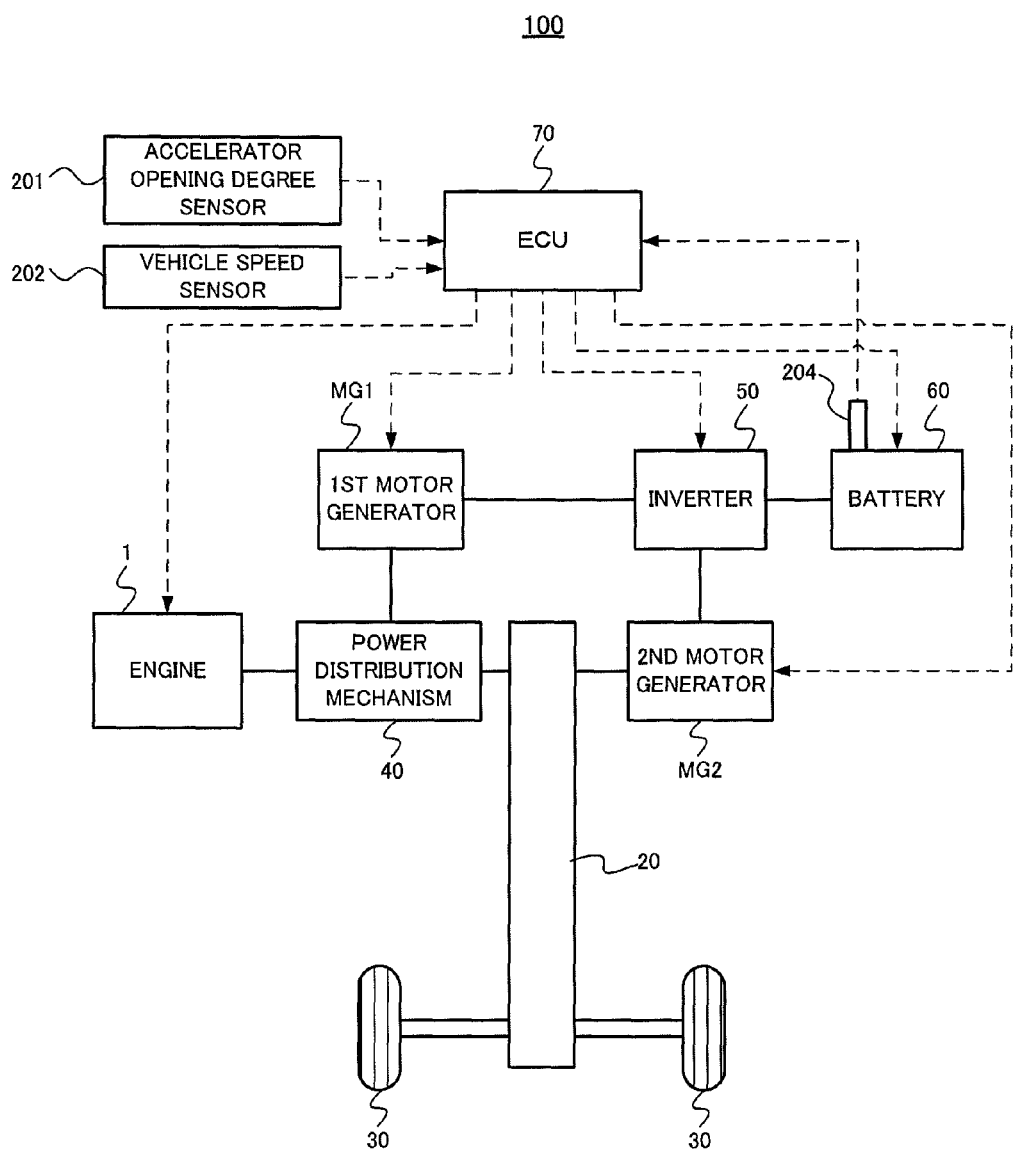
FIG. 1 shows a schematic configuration of a hybrid vehicle.

FIG. 1 shows a schematic configuration of a hybrid vehicle 100 in the embodiment. In FIG. 1, broken arrows show the input/output of signals.

The hybrid vehicle 100 mainly includes an engine (internal combustion engine) 1, an axle 20, wheels 30, a first motor generator MG1, a second motor generator MG2, a power distribution mechanism 40, an inverter 50, a battery 60 and an ECU (Electronic Control Unit) 70.

The axle 20 is a part of a power transmission system which transmits the power of the engine 1 and the second motor generator MG2 to the wheels 30. The wheels 30 are the wheels of the hybrid vehicle 100, and FIG. 1 especially shows only the right and left front wheels to simplify the explanation. The engine 1 is a gasoline engine, for example, and functions as a power source for outputting major driving force of the hybrid vehicle 100. For the engine 1, various controls are performed by the ECU 70.

The first motor generator MG1 is configured to function as a generator to mainly charge the battery 60 or a generator to supply the electric power to the second motor generator MG2, and performs the electric generation by the output of the engine 1. The second motor generator MG2 is configured to function as a generator to mainly assist the output of the engine 1. In addition, the second motor generator MG2 generates a braking power (regenerative braking power) by functioning as a regenerative brake at the time of braking by an engine brake or a foot brake. Namely, the second motor generator MG2 has a regenerative function of converting kinetic energy to electric energy, and generates power by the regenerative operation. The motor generators MG1 and MG2 are configured as a synchronous motor generator, for example, and include a rotor having plural permanent magnets on the outer circumferential surface and a stator around which three-phase coils are wound.

The power distribution mechanism 40 corresponds to the planetary gear having a sun gear and a ring gear, and is configured to distribute the output of the engine 1 to the first motor generator MG1 and the axle 20.

The inverter 50 is a DC/AC converter which controls the input/output of the electric power between the battery 60 and the first motor generator MG1, and controls the input/output of the electric power between the battery 60 and the second motor generator MG2. For example, the inverter 50 converts the AC electric power generated by the first motor generator MG1 to the DC electric power and supplies it to the battery 60. Additionally, the inverter 50 converts the DC electric power taken out from the battery 60 to the AC electric power and supplies it to the second motor generator MG2.

The battery 60 is configured to function as a power supply to drive the first motor generator MG1 and/or the second motor generator MG2, and to charge the electric power generated by the first motor generator MG1 and/or the second motor generator MG2. The battery 60 is provided with a SOC sensor 204 capable of detecting a state of charge (SOC) of the battery 60. The SOC sensor 204 provides the ECU 70 with a detection signal corresponding to the detected SOC.

In the following description, the expression of "motor generator MG" is used when the first motor generator MG1 and the second motor generator MG2 are not discriminated from each other.

The ECU 70 includes a CPU (Central Processing Unit), a ROM (Read Only Memory) and a RAM (Random Access Memory), and executes various controls to each constitutional elements in the hybrid vehicle 100. For example, the ECU 70 performs a control based on an accelerator opening degree detected by an accelerator opening degree sensor 201, a vehicle speed detected by a vehicle speed sensor 202 and an outside air-temperature detected by an outside air-temperature sensor 203. As described later in detail, the ECU 70 corresponds to an example of the electrification characteristic setting unit, the permissible resistance range setting unit and the abnormal electrification determining unit in the present invention.

Figure 2:
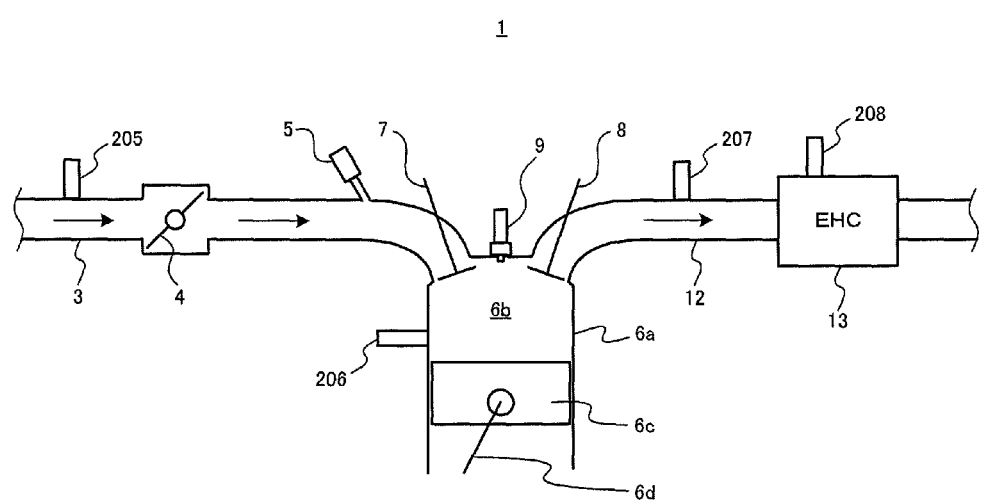
FIG. 2 shows a schematic configuration of an engine.

Next, a concrete description will be given of the engine 1, with reference to FIG. 2. FIG. 2 shows a schematic configuration of the engine 1.

The engine mainly includes an intake air passage 3, a throttle valve 4, a fuel injection valve 5, a cylinder 6a, an intake valve 7, an exhaust valve 8, a spark plug 9, an exhaust passage 12 and an EHC (electrically heated catalyst) 13. Though only one cylinder 6a is shown in FIG. 2 to simplify the explanation, the engine 1 actually includes plural cylinders 6a.

The intake air from the outside passes through the intake air passage 3, and the throttle valve 4 adjusts the flow amount of the gas passing through the intake air passage 3. The intake air passing through the intake air passage 3 is supplied to a combustion chamber 6b. The combustion chamber 6b is supplied with the fuel injected by the fuel injection valve 5, too. The intake valve 7 and the exhaust valve 8 are provided on the combustion chamber 6b. By opening and closing the intake valve 7, the flow and cutoff of the intake air in the intake air passage 3 is switched. By opening and closing the exhaust valve 8, the flow and cutoff of the exhaust gas in the exhaust passage 12 is switched.

In the combustion chamber 6b, the fuel-air mixture of the intake air and the fuel burns by the ignition of the spark plug 9. For the spark plug 9, the ECU 70 performs the control of the ignition timing. The piston 6c is reciprocated by the burning, and the reciprocation is transmitted to a crank axis (which is not shown) via the con rod 6d. As a result, the crank axis rotates. The exhaust gas generated by the burning in the combustion chamber 6b is discharged to the exhaust passage 12.

The exhaust passage 12 is provided with the EHC 13 which purifies the exhaust gas and is warmed by the electrification. The EHC 13 will be described in details, later. Another catalyst (for example, three-way catalyst) may be provided on the exhaust passage 12 at the downstream position of the EHC 13.

Additionally, the engine 1 is provided with various sensors. An air flow meter 205 is provided on the intake air passage 3 and detects an intake air amount. A water temperature sensor 206 is provided on a passage in which cooling water for cooling the engine 1 flows, and detects a temperature of the cooling water (hereinafter referred to as "engine water temperature"). An air-fuel ratio sensor 207 is provided on the exhaust passage 12, and detects an air-fuel ratio (A/F) of the exhaust gas. A floor temperature sensor 208 detects a floor temperature (hereinafter referred to as "EHC floor temperature") of the catalyst in the EHC 13. For example, the floor temperature sensor 208 is provided on the EHC carrier (which is not shown) in the EHC 13. These sensors provide the detection signals to the ECU 70.

Figure 3A:
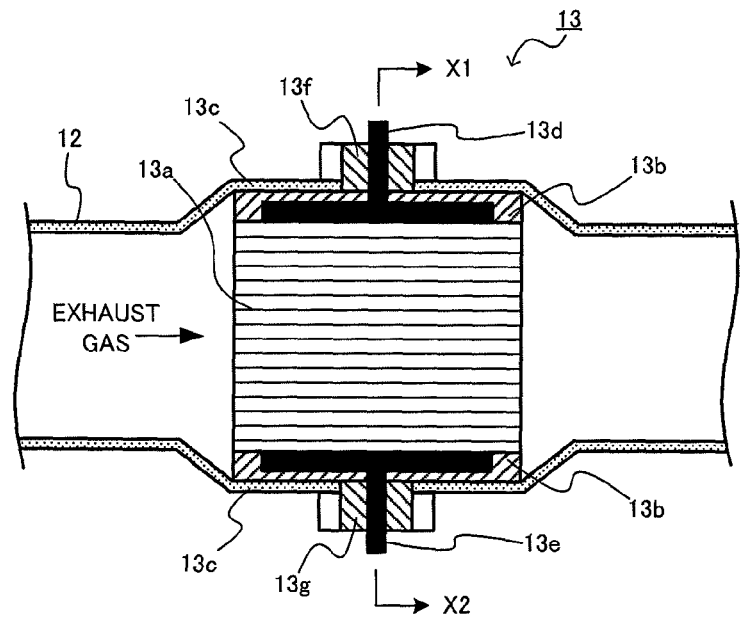
FIGS. 3A and 3B show schematic configuration of an EHC.
Figure 3B:
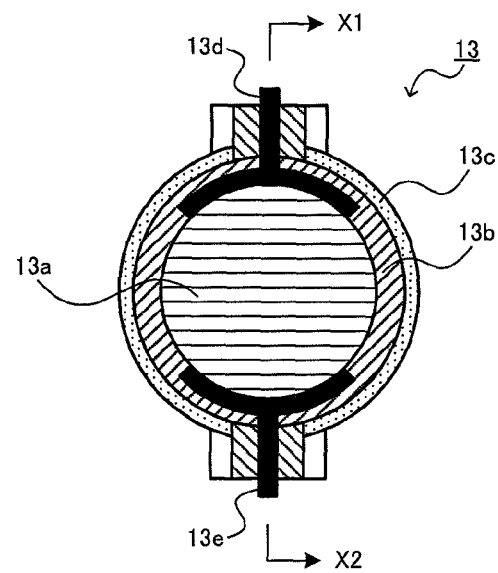

Next, a concrete description will be given of the EHC 13, with reference to FIGS. 3A and 3B. FIGS. 3A and 3B show schematic configurations of the EHC 13.

FIG. 3A shows a cross-sectional view of the EHC 13 along a longitudinal direction of the exhaust passage 12. FIG. 3B shows a cross-sectional view of the EHC 13 along a line X1-X2 in FIG. 3A. As shown in FIGS. 3A and 3B, the EHC 13 includes an EHC carrier 13a, a retention mat 13b, a case 13c, a positive electrode 13d, a negative electrode 13e and insulators 13f and 13g.

The EHC carrier 13a has a honeycombed cross-section, and supports the catalyst. For example, the EHC carrier 13a is formed by SiC (silicon dioxide). The EHC carrier 13a has the conductive property.

The retention mat 13b is positioned to cover the outer periphery of the EHC carrier 13a and the inner periphery of the case 13c, and retains the EHC carrier 13a. The retention mat 13b is formed by interweaving the fibrous metallic oxide such as alumina, and has the electrical insulation property. Additionally, the retention mat 13b has the thermal insulation property.

The case 13c is a chassis of the EHC 13 which is formed by the metallic material such as SUS. The case 13c is connected to the exhaust passage 12 via a connection member (which is not shown) at the upstream and downstream ends.

The positive electrode 13d is an electrode for applying the positive voltage, and the end of the positive electrode 13d is fixed on the periphery of the EHC carrier 13a. The negative electrode 13e is an electrode for applying the negative voltage, and the end of the negative electrode 13e is fixed on the periphery of the EHC carrier 13a. The positive electrode 13d and the negative electrode 13e are covered by the insulators 13f and 13g which are formed by the insulation material such as alumina, so as to maintain the electrically insulated condition.

As for the above EHC 13, when the positive voltage based on the potential of the negative electrode 13e is applied to the positive electrode 13d, the current flows through the EHC carrier 13a having the conductive material, and the EHC carrier 13a generates the heat. By the heat, the temperature of the catalyst supported by the EHC carrier 13a increases, and the catalyst immediately makes the transition to a catalyst activated state. The above configuration of the EHC 13 is an example. Various heretofore known manners can be applied to the configuration of the EHC carrier, the setting manner of each electrode and the control manner, for example.

Here, the above ECU 70 performs a control for warming the EHC 13 (namely, catalyst warming control). Concretely, the ECU 70 performs a control of heating the catalyst by electrifying the EHC 13, or a control of heating the catalyst by the exhaust gas of the engine 1. Hereinafter, the control of heating the catalyst by electrifying the EHC 13 is referred to as "catalyst warming by the electrification", and the control of heating the catalyst by the exhaust gas of the engine 1 is referred to as "catalyst warming by engine". Specifically, when the EHC floor temperature is equal to or lower than a predetermined temperature, the ECU 70 performs the catalyst warming by the electrification or the catalyst warming by the engine 1, so as to maintain the EHC floor temperature equal to or higher than a temperature (namely, activating temperature) at which the catalyst in the EHC 13 exerts an optimum exhaust purification performance. Hereinafter, the predetermined temperature used for the determination of the EHC floor temperature is suitably referred to as "catalyst warming determination temperature". The catalyst warming determination temperature is set based on the activating temperature of the catalyst in the EHC 13. Basically, when the EHC floor temperature is equal to or lower than the catalyst warming determination temperature, the ECU 70 issues a request for electrifying the EHC 13 for the purpose of the catalyst warming (hereinafter, the request is referred to as "request for electrifying EHC").

When the catalyst warming by the electrification is performed, the ECU 70 performs the control of making the hybrid vehicle 100 travel by using the output of the engine 1, for example. In contrast, when the catalyst warming by the engine 1 is performed, the ECU 70 performs the control of making the hybrid vehicle 100 travel by using the output of the motor generator MG, for example. Namely, a so-called "EV traveling" is performed. In this case, while the ECU 70 makes the engine 1 perform a driving corresponding to an idling driving, for example, the ECU 70 performs a control of delaying the ignition timing so as to increase the exhaust gas temperature.

Concrete embodiments (a first embodiment to a third embodiment) of a process executed by the ECU 70 will be described below.

1st Embodiment

In the first embodiment, the ECU 70 sets an electrification characteristic (hereinafter referred to as "a reference electrification characteristic") indicating a characteristic of electrification resistance value of the EHC 13 in accordance with the electrification condition at the time of starting the electrification. Also, the ECU 70 sets the electrification resistance value (hereinafter referred to as "a judgment resistance value") for determining whether or not the EHC floor temperature reaches a target floor temperature (i.e., a catalyst warming determination temperature), namely, for determining whether or not the EHC electrification is completed, based on the electrification condition at the time of starting the electrification of the EHC 13.

Here, "the reference electrification characteristic" corresponds to the characteristic of the electrification resistance value in the EHC 13 in accordance with the condition when the current is applied to the EHC 13, and is an electrification characteristic used for various determinations relating to the EHC 13. Concretely, the reference electrification characteristic is expressed by the relationship of any one of the EHC floor temperature, the supplied energy to the EHC 13 (indicated by "the supplied power"דthe electrification time", the same shall apply hereinafter) and the electrification time to the EHC 13, with respect to the electrification resistance value of the EHC 13. In this case, the electrification resistance becomes lower as the EHC floor temperature becomes higher, the electrification resistance value becomes lower as the supplied energy to the EHC 13 becomes larger, and the electrification resistance value becomes lower as the electrification time to the EHC 13 becomes longer. For example, the reference electrification characteristic is used to determine whether or not the electrification state of the EHC 13 is normal or abnormal, i.e., to determine the abnormal electrification of the EHC 13.

"The electrification resistance value of the EHC 13" corresponds to the inter-terminal resistance between the positive electrode 13*d* and the negative electrode 13*e* when the EHC 13 is electrified. Specifically, the electrification resistance value corresponds to the total resistance of the SiC resistance by the EHC floor temperature and the contact resistance at the contact electrode. In this case, the electrification resistance value is calculated by the current value and the voltage value at the time of electrifying the EHC 13. The current value and the voltage value are detected by a sensor, for example.

"The electrification condition at the time of electrification" is defined by the parameters (factors) affecting the electrification characteristic of the EHC 13, and is used to set the reference electrification characteristic. In the following description, such a parameter is referred to as "an electrification characteristic setting parameter". Concretely, at least one of the EHC floor temperature at the time of starting the electrification, the supplied power to the EHC 13 at the time of starting the electrification, and the degree of temperature dispersion inside the EHC 13 at the time of starting the electrification is used as the electrification characteristic setting parameter.

Next, with reference to FIGS. 4 to 6, the description will be given of the reason why the reference electrification characteristic and the judgment resistance value are set in the above-mentioned manner.

Figure 4:
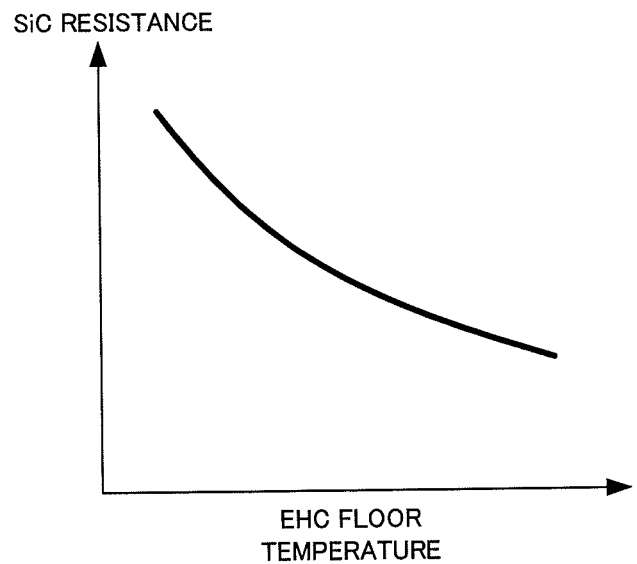
FIG. 4 shows an example of NTC characteristic of Sic in the EHC.

FIG. 4 shows an example of the NTC characteristic of SiC in the EHC 13. In FIG. 4, the horizontal axis indicates the EHC floor temperature, and the vertical axis indicates the resistance of SiC. As shown, SiC has such a NTC characteristic that the resistance decreases as the temperature increases. Therefore, it can be said that, by obtaining such a NTC characteristic in advance, the EHC floor temperature can be estimated from the SiC resistance based on the NTC characteristic. It is noted that the SiC resistance corresponds to the electrification resistance value of the EHC 13 described above.

Figure 5:
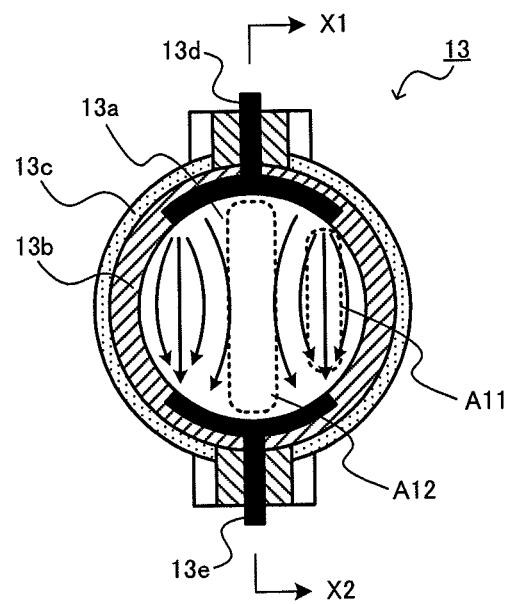
FIG. 5 shows an example of a current distribution inside the EHC.

FIG. 5 shows an example of a current distribution inside the EHC 13, specifically inside the EHC carrier 13*a*. Similarly to FIG. 3, FIG. 5 shows the sectional view of the EHC 13 along the cutting line X1-X2 in FIG. 3A. Also, in FIG. 5, the arrows shown in the EHC carrier 13*a* schematically illustrate the current flowing in the EHC carrier 13*a*.

As shown in FIG. 5, it is understood that ununiformity of the current flowing in the EHC carrier 13*a* is caused. Due to the ununiformity of the current of this kind, the temperature distribution of the EHC floor temperature is created, i.e., the temperature dispersion is caused inside the EHC 13. Concretely, there occur a high temperature area shown by the broken line area A11 and a low temperature area shown by the broken line area A12. Therefore, basically the low resistance value in the high temperature area is detected as the electrification resistance value, and hence it can be said that the electrification resistance value thus detected does not accurately represent the state of the EHC 13 in its entirety. Hereinafter, the degree of the temperature dispersion of the EHC floor temperature caused inside the EHC 13 will be expressed as "ΔT".

Here, the temperature dispersion ΔT of the EHC floor temperature tends to be larger as the supplied energy to the EHC 13 is larger. Therefore, the temperature dispersion ΔT tends to be larger as the EHC floor temperature at the time of starting the electrification is lower, and the temperature dispersion ΔT tends to be larger as the supplied power to the EHC 13 is larger.

In an example, the temperature difference between the highest temperature and the lowest temperature inside the EHC 13 is used as the temperature dispersion ΔT. In another example, the temperature difference at certain positions inside the EHC 13 is used as the temperature dispersion ΔT. For example, the temperature difference between the center part and the edge part of the EHC carrier 13a is used.

The temperature dispersion ΔT described above may be obtained based on a map created by performing an experiment or a simulation in advance. Concretely, the temperature dispersion ΔT can be obtained by using a map indicating the temperature distribution inside the EHC 13 according to the electrification condition and a map indicating the temperature distribution inside the EHC 13 at the time of the heat radiation after ending the electrification.

Figure 6A:
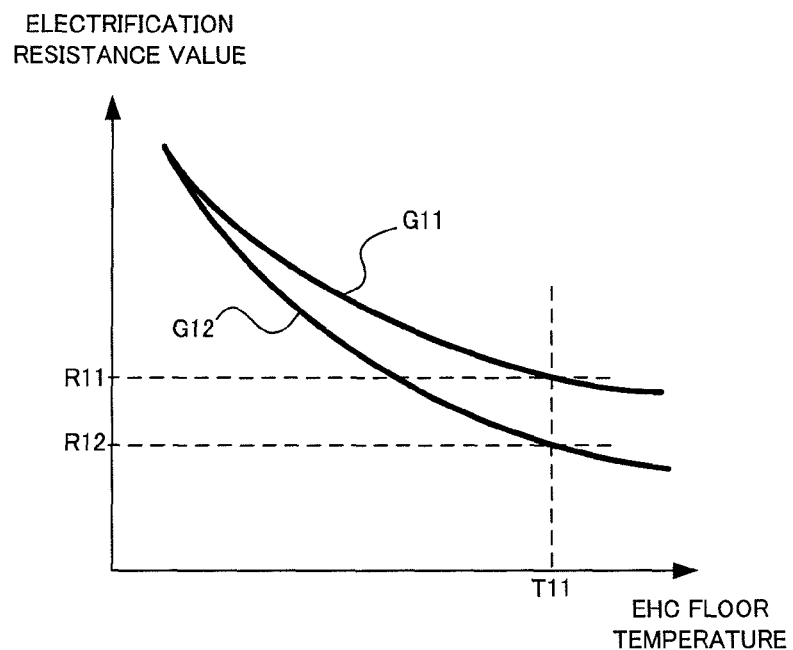
FIGS. 6A and 6B show diagrams for explaining variation of an electrification resistance value and an error of a judgment resistance value due to temperature dispersion.
Figure 6B:
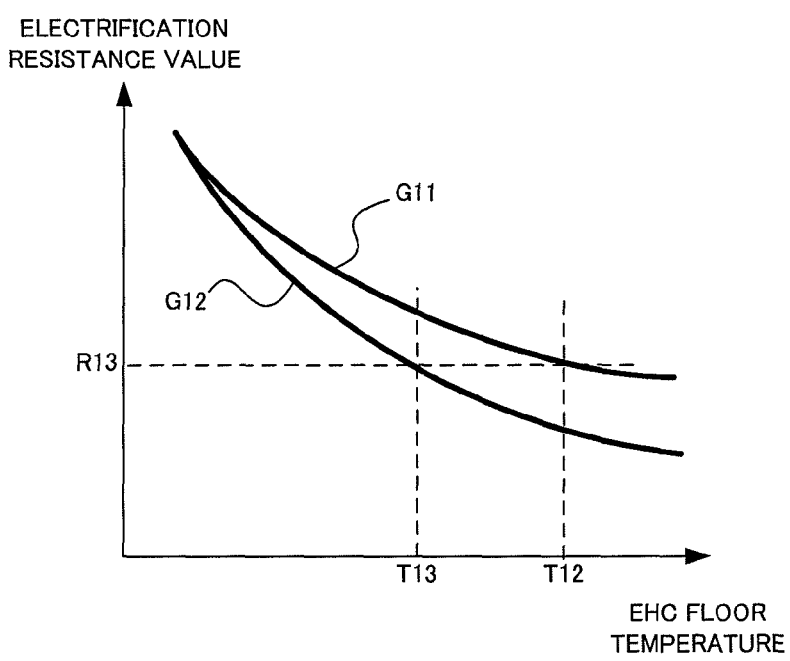

FIGS. 6A and 6B are diagrams for explaining the variation of the electrification resistance value and the error of the judgment resistance value due to the temperature dispersion ΔT. In FIGS. 6A and 6B, the horizontal axis indicates the EHC floor temperature, and the vertical axis indicates the electrification resistance value. The graph G11 illustrates an example of the electrification characteristic in the case where the temperature dispersion ΔT is small, and the graph G12 illustrates an example of the electrification characteristic in the case where the temperature dispersion ΔT is larger than the case of the graph G11.

As shown by the graph G11 in FIG. 6A, if the temperature dispersion ΔT is small, the electrification resistance value becomes "R11" when the EHC floor temperature becomes "T11". On the other hand, as shown by the graph G12, if the temperature dispersion ΔT is large, the electrification resistance value becomes "R12" when the EHC floor temperature becomes "T11". In this case, the electrification resistance value R12 is lower than the electrification resistance value R11. From this, it is understood that, even if the EHC floor temperature is the same, different electrification resistance values are obtained according to the temperature dispersion ΔT.

As shown by the graph G11 in FIG. 6B, if the temperature dispersion ΔT is small, the EHC floor temperature becomes "T12" when the electrification resistance value becomes the judgment resistance value "R13". On the other hand, if the temperature dispersion ΔT is large, the EHC floor temperature becomes "T13" when the electrification resistance value becomes the judgment resistance value R13. In this case, the EHC floor temperature T13 is lower than the EHC floor temperature T12. From this, if the temperature dispersion ΔT is large, there is a possibility that the EHC floor temperature does not reach the target floor temperature even if the electrification resistance value becomes the judgment resistance value R13. Therefore, it is thought that sometimes the temperature of the EHC 13 cannot be sufficiently increased.

As described above, it can be said that the reference electrification characteristic of the EHC 13 is affected by the electrification condition at the time of starting the electrification of the EHC 13 and tends to change, i.e., is not uniquely determined. Concretely, it is thought that the reference electrification characteristic tends to change in accordance with the EHC floor temperature, the supplied power and the temperature dispersion ΔT at the time of starting the electrification. Thus, it is thought that the estimation of the EHC floor temperature by using the electrification resistance value, the determination of the completion of the electrification of the EHC 13 by using the judgment resistance value and the determination of the abnormal electrification of the EHC 13 by using the reference electrification characteristic cannot be accurately performed without considering that the reference electrification characteristic changes.

Therefore, in the first embodiment, the reference electrification characteristic and the judgment resistance value are set in accordance with the electrification condition at the time of starting the electrification, i.e., in accordance with the parameters (the electrification characteristic setting parameters) affecting the reference electrification characteristic. Concretely, the ECU 70 sets the reference electrification characteristic and the judgment resistance value by using the EHC floor temperature at the time of starting the electrification, the supplied power to the EHC 13 at the time of starting the electrification and the temperature dispersion inside the EHC 13 at the time of starting the electrification as the electrification characteristic setting parameters. Specifically, the ECU 70 sets the electrification characteristic of the EHC 13 at a certain condition (e.g., the EHC floor temperature is 25 [° C.] and the supplied power is 6 [kW]) as a base characteristic in advance, and sets the reference electrification characteristic by correcting the base characteristic based on the electrification characteristic setting parameters, by using the base characteristic as the reference electrification characteristic before the correction. For example, the ECU 70 corrects the reference electrification characteristic to have a lower electrification resistance value as the EHC floor temperature at the time of starting the electrification is lower, corrects the reference electrification characteristic to have a lower electrification resistance value as the supplied power at the time of starting the electrification is larger, or corrects the reference electrification characteristic to have a lower electrification resistance value as the temperature dispersion at the time of starting the electrification is larger. Then, the ECU 70 sets, as the judgment resistance value, the electrification resistance value corresponding to the target floor temperature in the reference electrification characteristic thus set.

In an example, the ECU 70 uses a correction amount map in which the correction amount for correcting the base characteristic for each electrification characteristic setting parameter is defined, and sets the reference electrification characteristic by correcting the base characteristic by the correction amount obtained from the correction amount map. In this example, the ECU 70 corrects the base characteristic by using the correction amount map in which the correction amount is associated with each of the EHC floor temperature at the time of starting the electrification, the supplied power to the EHC 13 at the time of starting the electrification and the temperature dispersion inside the EHC 13 at the time of starting the electrification.

The base characteristic and the correction amount map described above are set by performing an experiment or a simulation in advance, for example.

Figure 7A:
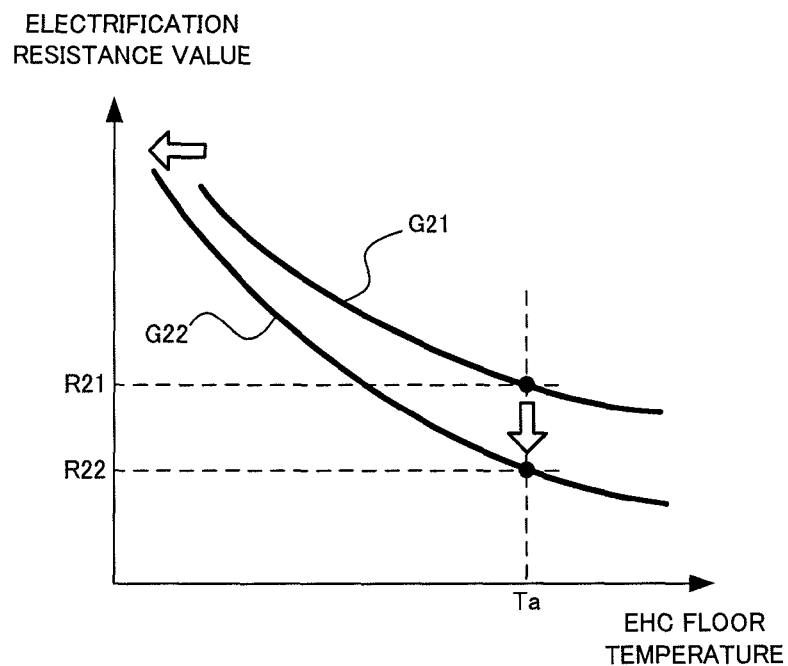
FIGS. 7A and 7B are diagrams for concretely explaining a method of setting a reference electrification characteristic and a judgment resistance value in a first embodiment.
Figure 7B:
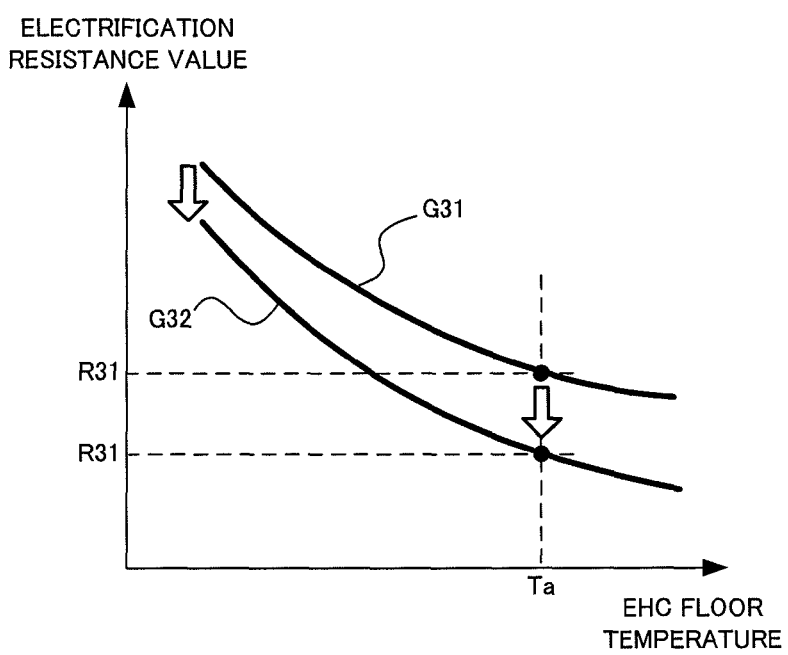

FIGS. 7A and 7B show concrete examples of the method of setting the reference electrification characteristic and the judgment resistance value according to the first embodiment. In FIGS. 7A and 7B, the horizontal axis indicates the EHC floor temperature, and the vertical axis indicates the electrification resistance value. The temperature "Ta" indicates the target floor temperature.

FIG. 7A shows a concrete example of a method of setting the reference electrification characteristic and the judgment resistance value in accordance with the EHC floor temperature at the time of starting the electrification. In FIG. 7A, the graph G21 illustrates an example of the base characteristic. Here, an example of the case where the EHC floor temperature at the time of starting the electrification is low (specifically, lower than the EHC floor temperature defining the predetermined condition used at the time of setting the base characteristic) is used. In this case, the ECU 70 corrects the base characteristic G21 to the reference electrification characteristic having low electrification resistance value illustrated by the graph G22. Namely, the ECU 70 sets the reference electrification characteristic G22, which is on lower resistance side than the base characteristic G21. Then, the ECU 70 sets the electrification resistance value R22, corresponding to the target floor temperature Ta in the reference electrification characteristic G22 thus set, as the judgment resistance value. Namely, the ECU 70 sets the judgment resistance value R22, which is on the lower resistance side than the judgment resistance value R21 in the base characteristic G21. It is noted that the ECU 70 basically sets the reference electrification characteristic and the judgment resistance value on the lower resistance side as the EHC floor temperature at the time of starting the electrification is lower.

FIG. 7B shows a concrete example of a method of setting the reference electrification characteristic and the judgment resistance value in accordance with the supplied power to the EHC 13 at the time of starting the electrification. In FIG. 7B, the graph G31 indicates an example of the base characteristic. Here, an example of the case where the supplied power at the time of starting the electrification is large (specifically, larger than the supplied power defining the predetermined condition used at the time of setting the base characteristic) is used. In this case, the ECU 70 corrects the base characteristic G31 to the reference electrification characteristic having a low electrification resistance value illustrated by the graph G32. Namely, the ECU 70 set the reference electrification characteristic G32, which is on the lower resistance side than the base characteristic G31. Then, the ECU 70 sets the electrification resistance value R32, corresponding to the target floor temperature Ta in the reference electrification characteristic G32 thus set, as the judgment resistance value. Namely, the ECU 70 sets the judgment resistance value R32, which is on the lower resistance side than the judgment resistance value R31 in the base characteristic G31. It is noted that the ECU 70 basically sets the reference electrification characteristic and the judgment resistance value on the lower resistance side as the supplied power at the time of starting the electrification is larger.

Figure 8:
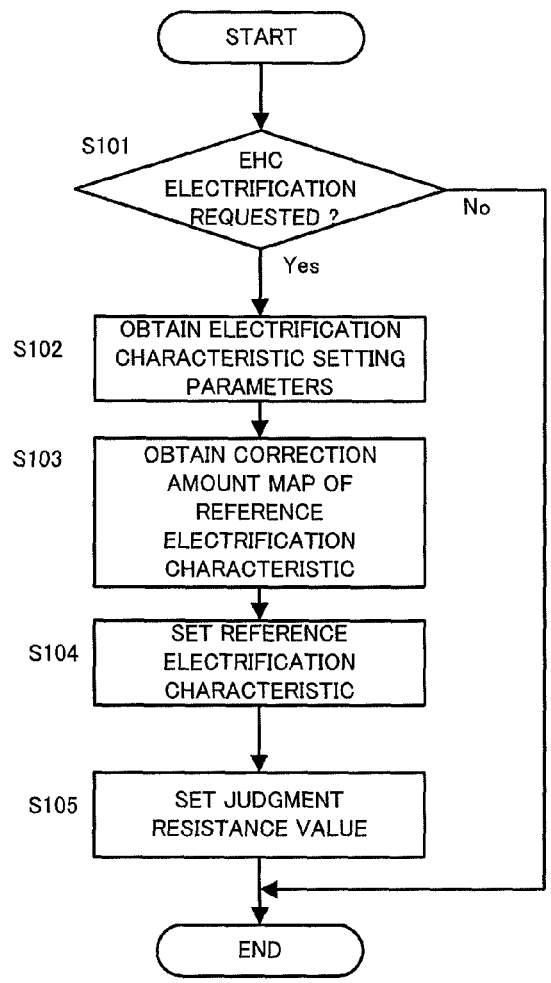
FIG. 8 is a flowchart showing the process in the first embodiment.

Next, by referring to FIG. 8, the process executed in the first embodiment will be concretely described. FIG. 8 is a flowchart showing the process in the first embodiment. This process is executed to set the reference electrification characteristic and the judgment resistance value. This process is repeatedly executed by the ECU 70 in a predetermined cycle. This process is executed after the hybrid vehicle 100 is started (e.g., after the ready-on).

First, in step S101, the ECU 70 determines whether or not the EHC electrification request exists. Concretely, the ECU 70 determines whether or not the EHC electrification request exists, based on the engine water temperature, the EHC floor temperature and the SOC of the battery 60. For example, the ECU 70 determines that the EHC electrification request exists, when the engine water temperature is within a predetermined temperature range and the EHC floor temperature is equal to or lower than a predetermined temperature (the catalyst warming judgment temperature) and the SOC is equal to or larger than a predetermined amount. The process goes to step S102 if the EHC electrification request exists (step S101; Yes), and the process ends if the EHC electrification request does not exist (step S101; No).

In step S202, the ECU 70 obtains the electrification characteristic setting parameters used to set the reference electrification characteristic. Concretely, the ECU 70 obtains the EHC floor temperature at the time of starting the electrification, the supplied power to the EHC 13 at the time of starting the electrification and the temperature dispersion inside the EHC 13 at the time of starting the electrification, as the electrification characteristic setting parameters. In this case, the ECU 70 obtains the EHC floor temperature detected by the floor temperature sensor 208 or estimates the EHC floor temperature by using predetermined parameters. The ECU 70 calculates the supplied power to the EHC 13 based on the current value and the voltage value when the EHC 13 is electrified. In this case, the ECU 70 obtains the current value and the voltage value from the sensors. Further, by referring to the map described above, the ECU 70 obtains the degree of the temperature dispersion inside the EHC 13. Then, the process goes to step S103.

In step S103, the ECU 70 obtains the correction amount map defining the correction amount for correcting the base characteristic in the reference electrification characteristic. Concretely, the ECU 70 obtains the correction amount map defined by the EHC floor temperature, the correction amount map defined by the supplied power and the correction amount map defined by the temperature dispersion. Then, the process goes to step S104.

In step S104, the ECU 70 sets the reference electrification characteristic based on the correction amount maps obtained in step S103. Concretely, the ECU 70 first refers to the correction amount maps to obtain the correction amount corresponding to the values of the electrification characteristic setting parameters obtained in step S102. For example, by referring to the correction amount map defined by the EHC floor temperature, the correction amount map defined by the supplied power and the correction amount map defined by the temperature dispersion, the ECU 70 obtains the correction amount corresponding to each of the EHC floor temperature, the supplied power and the temperature dispersion obtained in step S102. Next, by correcting the base characteristic by the correction amounts thus obtained, the ECU 70 sets the reference electrification characteristic. For example, by correcting the base characteristic based on the correction amount obtained by the EHC floor temperature, the correction amount obtained by the supplied power and the correction amount obtained by the temperature dispersion, the ECU 70 set the reference electrification characteristic. Then, the process goes to step S105.

In step S105, the ECU 70 sets the judgment resistance value based on the reference electrification characteristic set in step S104. Concretely, the ECU 70 sets the electrification resistance value corresponding to the target floor temperature in the reference electrification characteristic set in step S104, as the judgment resistance value. Then, the process ends.

According to the first embodiment described above, the reference electrification characteristic and the judgment resistance value can be appropriately set in accordance with the electrification condition at the time of starting the electrification of the EHC 13. Therefore, the estimating the EHC floor temperature by using the electrification resistance value, determining the completion of the electrification of the EHC 13 by using the judgment resistance value and determining the abnormal electrification of the EHC 13 by using the reference electrification characteristic can be accurately performed, for example. Also, the control of increasing the temperature of the EHC 13 by the electrification can be executed with high accuracy.

The modifications of the first embodiment will be described below.

While an example is shown in the above description in which all the EHC floor temperature at the time of starting the electrification, the supplied power to the EHC 13 at the time of starting the electrification and the temperature dispersion inside the EHC 13 at the time of starting the electrification are used as the electrification characteristic setting parameters, the present invention is not limited to this. Namely, the present invention is not limited to setting the reference electrification characteristic and the judgment resistance value based on all the EHC floor temperature, the supplied power and the temperature dispersion. In another example, the ECU 70 may set the reference electrification characteristic and the judgment resistance value by using any two of the EHC floor temperature, the supplied power and the temperature dispersion, or by using any one of the EHC floor temperature, the supplied power and the temperature dispersion.

Further, while an example is shown in the above description in which the reference electrification characteristic is set and then the judgment resistance value is set based on the reference electrification characteristic thus set, the present invention is not limited to this. For example, when only the judgment resistance value is necessary, the judgment resistance value may be directly obtained without obtaining the reference electrification characteristic. In this case, the judgment resistance value may be set by the method similar to the above-described method of setting the reference electrification characteristic. Concretely, the ECU 70 may use the judgment resistance value defined in the base characteristic (hereinafter referred to as "reference judgment resistance value") and the correction amount map for correcting the reference judgment resistance value defined by the electrification characteristic setting parameters. Then, the ECU 70 may obtain the correction amount corresponding to the electrification characteristic setting parameters from the correction amount map, and may set the judgment resistance value by correcting the reference judgment resistance value based on the correction amount thus obtained. It is noted that the reference judgment resistance value and the correction amount map are set by performing an experiment or a simulation in advance.

Further, while an example is shown in the above description in which the reference electrification characteristic and the judgment resistance value are set by correcting the base characteristic based on the correction amount map, the present invention is not limited to this. Namely, the present invention is not limited to setting the reference electrification characteristic and the judgment resistance value by correcting the base characteristic. In another example, instead of using the base characteristic and the correction amount map, it is possible to use a map in which the reference electrification characteristic and the judgment resistance value to be set are directly associated with the electrification characteristic setting parameters. In this example, by referring to that map, the ECU 70 may set the reference electrification characteristic and the judgment resistance value corresponding to the electrification characteristic setting parameters. It is noted that such a map is also set by performing an experiment or a simulation in advance.

Further, while an example is shown in the above description in which the reference electrification characteristic defined by the EHC floor temperature is set (see. FIGS. 7A and 7B), the reference electrification characteristic defined by the supplied energy to the EHC 13 or the electrification time to the EHC 13, instead of the EHC floor temperature, may be set. Namely, it is possible to set the reference electrification characteristic represented by the relation of the supplied energy to the EHC 13 or the electrification time to the EHC 13 with respect to the electrification resistance value. In this case, the ECU 70 may basically set the reference electrification characteristic defined by the supplied energy or the electrification time by the similar method to the method of setting the reference electrification characteristic described above.

Here, when the judgment resistance value is set in the case where the reference electrification characteristic defined by the supplied energy is used, the supplied energy necessary to make the EHC floor temperature reach the target floor temperature is obtained in advance, and the electrification resistance value corresponding to the supplied energy in the reference electrification characteristic may be set as the judgment resistance value. Similarly, when the judgment resistance value is set in the case where the reference electrification characteristic defined by electrification time is used, the electrification time necessary to make the EHC floor temperature reach the target floor temperature is obtained in advance, and the electrification resistance value corresponding to the electrification time in the reference electrification characteristic may be set as the judgment resistance value.

The method of setting the judgment resistance value in the case where the reference electrification characteristic defined by the supplied energy or the electrification time is used as described above is similarly applied to the following embodiments.

2nd Embodiment

Next, the second embodiment will be described. In the second embodiment, in the case where the reference electrification characteristic set by the method of the first embodiment is used, the reference electrification characteristic and the judgment resistance value are corrected if the actual electrification resistance value of the EHC 13 is lower than the electrification resistance value obtained from the reference electrification characteristic. Concretely, in the second embodiment, the actual electrification resistance value (hereinafter referred to as "a measured resistance value") is obtained, and the electrification resistance value corresponding to the EHC floor temperature at the time of starting the electrification (hereinafter referred to as "reference resistance value") is obtained. Then, the reference electrification characteristic and the judgment resistance value are corrected if the measured resistance value is lower than the reference resistance value. Specifically, the ECU 70 corrects the reference electrification characteristic and the judgment resistance value to the lower resistance side as the difference between the reference resistance value and the measured resistance value (It means the value obtained by subtracting the measured resistance value from the reference resistance value. The same shall apply hereinafter.) is larger.

The reason why such a correction is made is as follows. In the case where the EHC 13 is electrified again, the EHC 13 is warm for a certain degree (hereinafter referred to "half warmed state"). In the half warmed state of the EHC 13, the temperature dispersion of the EHC floor temperature at the time of starting the electrification becomes large, in comparison with the case where the EHC 13 is hardly warmed, and the electrification resistance value tends to show a low value. Therefore, when the EHC 13 in the half warmed state is electrified, there is a possibility that the situation similar to the situation shown in FIG. 6B takes place. Namely, there may occur such a situation that, even if the high temperature area of the EHC 13 reaches the target floor temperature, the EHC floor temperature does not reach the target floor temperature.

Therefore, in the second embodiment, in order to overcome the deficiency that may occur in the EHC 13 in the half warmed state, the reference electrification characteristic and the judgment resistance value are corrected to the low resistance side if the measured resistance value is lower than the reference resistance value. Thus, even if the electrification of the EHC 13 is started in the half warmed state, determining the completion of the electrification by using the judgment resistance value can be performed with high accuracy, i.e., the control of warming the EHC 13 by the electrification can be performed with high accuracy.

Figure 9:
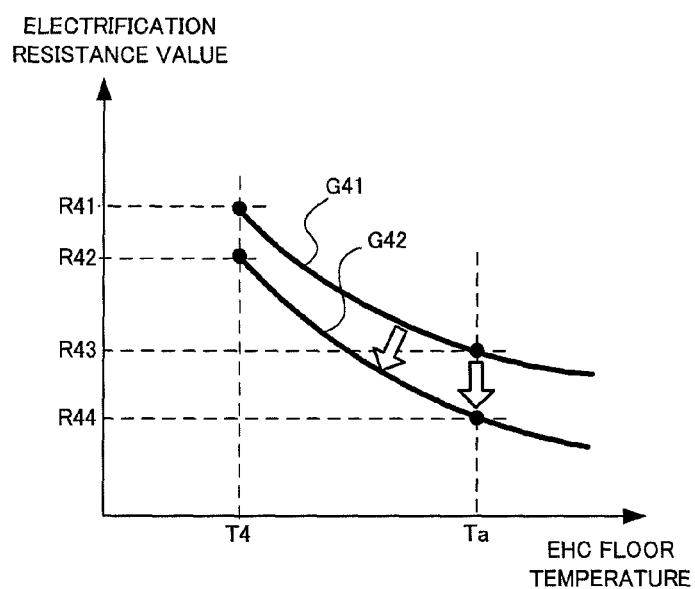
FIG. 9 is a diagram for concretely explaining a method of correcting the reference electrification characteristic and the judgment resistance value in a second embodiment.

FIG. 9 is a diagram showing a concrete example of the method of correcting the reference electrification characteristic and the judgment resistance value in the second embodiment. In FIG. 9, the horizontal axis indicates the EHC floor temperature, and the vertical axis indicates the electrification resistance value. The temperature "Ta" indicates the target floor temperature, the graph G41 illustrates an example of the reference electrification characteristic set by the method of the first embodiment, and the electrification resistance value R43 indicates an example of the judgment resistance value set by the method of the first embodiment.

Here, it is assumed that "R41" is obtained as the reference resistance value and "R42" is obtained as the measured resistance value. The reference resistance value R41 is the electrification resistance value corresponding to the EHC floor temperature T4 in the reference electrification characteristic G41. In this case, the ECU 70 corrects the reference electrification characteristic G41 to the reference electrification characteristic having the lower electrification resistance value as shown by the graph G42. Namely, the ECU 70 corrects the reference electrification characteristic to the reference electrification characteristic G42, which is on the lower resistance side than the reference electrification characteristic G41. Concretely, the ECU 70 corrects the reference electrification characteristic G41 to the reference electrification characteristic G42 by using the correction amount in accordance with the difference between the reference resistance value R41 and the measured resistance value R42. Also, the ECU 70 determines the reference electrification characteristic G42 on which the measured resistance value R42 exists.

Then, in the reference electrification characteristic G42, the ECU 70 sets the electrification resistance value R44 corresponding to the target floor temperature Ta as the judgment resistance value. Namely, the ECU 70 corrects the judgment resistance value to the judgment resistance value R44, which is on the lower resistance side than the judgment resistance value R43 in the reference electrification characteristic G41. Basically, the ECU 70 corrects the reference electrification characteristic and the judgment resistance value to the lower resistance side by using the correction amount of a larger value, as the difference between the reference resistance value and the measured resistance value is larger.

Figure 10:
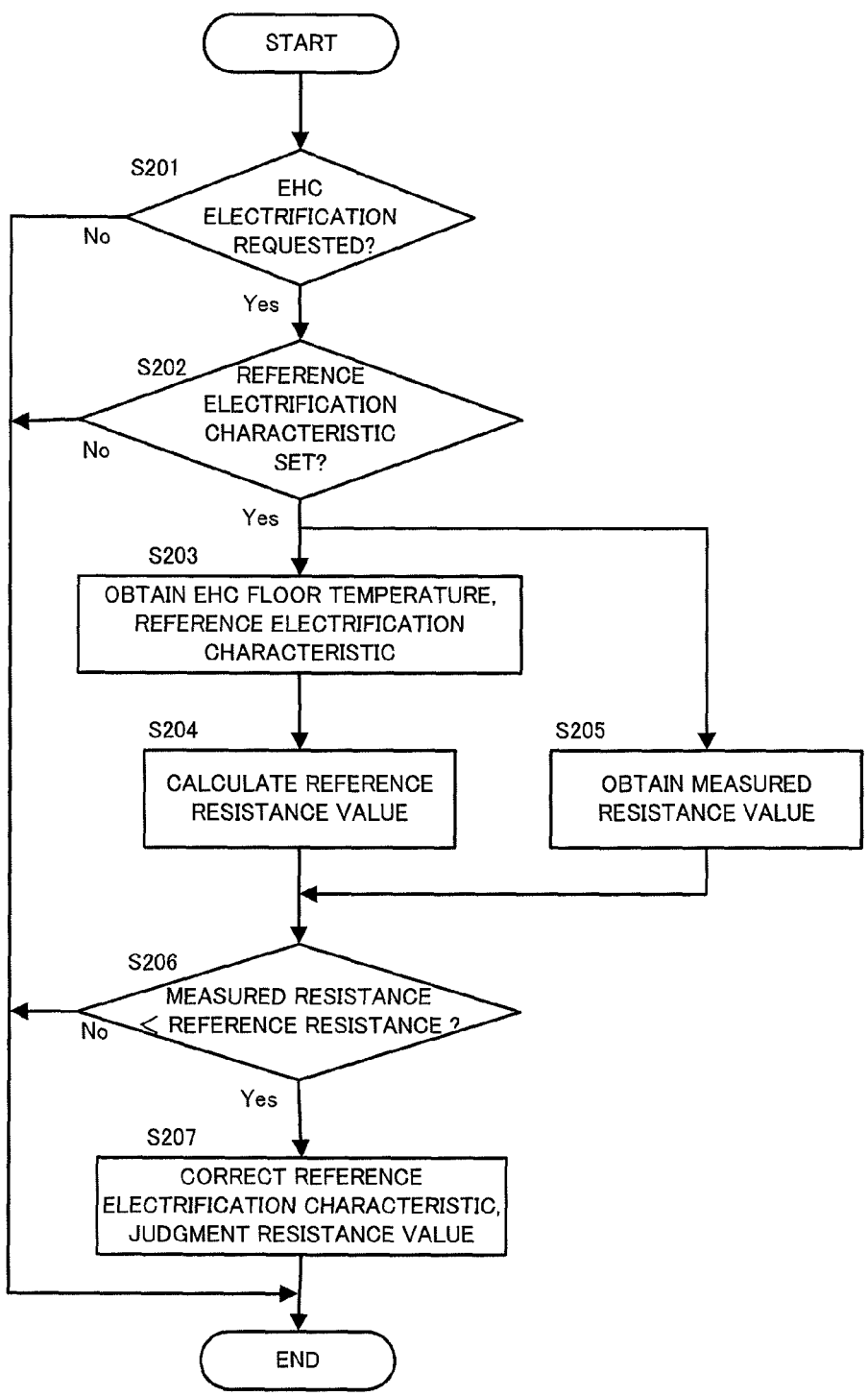
FIG. 10 is a flowchart showing the process in the second embodiment.

Next, with reference to FIG. 10, the process executed in the second embodiment will be concretely described. FIG. 10 is a flowchart showing the process in the second embodiment. This process is executed to correct the reference electrification characteristic and the judgment resistance value set by the method of the first embodiment. This process is repeatedly executed in a predetermined cycle. It is noted that this process is executed after the hybrid vehicle 100 is started (e.g., after the ready-on).

First, in step S201, the ECU 70 determines whether or not the EHC electrification request exists. Since the process in step S201 is the same as the process in step S101 described above, the detailed description will be omitted. The process goes to step S202 if the EHC electrification request exists (step S201; Yes), and the process ends if the EHC electrification request does not exist (step S201; No).

In step S202, the ECU 70 determines whether or not the reference electrification characteristic and the judgment resistance value have been set. Namely, the ECU 70 determines whether or not the reference electrification characteristic and the judgment resistance value set by the method of the first embodiment exist. The process goes to steps S203 and S205 if the reference electrification characteristic and the judgment resistance value have been set (step S202; Yes), and the process ends if the reference electrification characteristic and the judgment resistance value have not been set (step S202; No).

In step S203, the ECU 70 obtains the EHC floor temperature and obtains the reference electrification characteristic already set. In this case, the ECU 70 obtains the EHC floor temperature detected by the floor temperature sensor 208, or estimates the EHC floor temperature by using predetermined parameters. Then, the process goes to step S204. In step S204, the ECU 70 obtains the reference resistance value based on the EHC floor temperature and the reference electrification characteristic obtained in step S203. Concretely, the ECU 70 uses the electrification resistance value corresponding to the EHC floor temperature in the reference electrification characteristic, as the reference resistance value. Then, the process goes to step S206.

The process of step S205 is executed in parallel with the process of steps S203 and S204. In step S205, the ECU 70 obtains the measured resistance value. Concretely, the ECU 70 calculates the measured resistance value based on the current value and the voltage value when the EHC 13 is electrified. The current value and the voltage value are detected by the sensors, for example. Then, the process goes to step S206.

In step S206, the ECU 70 determines whether or not the measured resistance value obtained in step S205 is lower than the reference resistance value obtained in step S204. If the measured resistance value is lower than the reference resistance value (step S206; Yes), the process goes to step S207. On the contrary, if the measured resistance value is not lower than the reference resistance value (step S206; No), the process ends. In this case, the reference electrification characteristic and the judgment resistance value are not corrected.

In step S207, the ECU 70 corrects the reference electrification characteristic and the judgment resistance value set by the method of the first embodiment. Concretely, the ECU 70 corrects the reference electrification characteristic and the judgment resistance value based on the difference between the reference resistance value and the measured resistance value. For example, the ECU 70 uses a map in which the correction value is associated with the difference between the reference resistance value and the measured resistance value, and corrects the reference electrification characteristic based on the correction value obtained from the map. Then, the ECU 70 sets the electrification resistance value corresponding to the target floor temperature in the reference electrification characteristic thus corrected, as the judgment resistance value. The map is set by performing an experiment or a simulation in advance. After the process of step S207, the process ends.

According to the second embodiment described above, if the electrification of the EHC 13 is started in the half warmed state, the control of warming the EHC 13 by the electrification can be performed with high accuracy, and the EHC floor temperature can surely reach the target floor temperature. Therefore, it becomes possible to exert the emission performance by ensuring the active area of the EHC 13.

The modifications of the second embodiment will be described below.

In the above description, an example is shown in which the reference electrification characteristic and the judgment resistance value are corrected, regardless of whether or not the EHC 13 is in the half warmed state. However, whether or not the EHC 13 is in the half warmed state can be determined, and the reference electrification characteristic and the judgment resistance value may be corrected only when the EHC 13 is in the half warmed state. In this case, determining whether or not the EHC 13 is in the half warmed state can be performed based on the temperature dispersion of the EHC floor temperature.

Further, in the above description, an example is shown in which the reference electrification characteristic defined by the EHC floor temperature is corrected (see. FIG. 9, etc.). However, the reference electrification characteristic defined, not by the EHC floor temperature, but by the supplied energy to the EHC 13 or the electrification time to the EHC 13 may be corrected. In this case, the ECU 70 can correct the reference electrification characteristic defined by the supplied energy or the electrification time, by the same method as the correction method of the reference electrification characteristic described above. Concretely, the ECU 70 can correct the reference electrification characteristic to the lower resistance side when the measured resistance value is lower than the reference resistance value. As the reference resistance value, the electrification resistance value in the reference electrification characteristic, corresponding to the supplied energy or the electrification time at the time of starting the electrification, is used.

Further, in the above description, an example is shown in which the reference electrification characteristic is corrected and then the judgment resistance value is set based on the reference electrification characteristic thus corrected. However, the present invention is not limited to this. For example, when only the judgment resistance value is necessary, only the judgment resistance value may be corrected, without correcting the reference electrification characteristic. In this case, the judgment resistance value may be corrected by the same method as the correction method of the reference electrification characteristic described above. Concretely, when the measured resistance value is lower than the reference resistance value, the ECU 70 corrects the judgment resistance value in the original reference electrification characteristic based on the difference between the reference resistance value and the measured resistance value.

3rd Embodiment

Next, the third embodiment will be described. In the third embodiment, based on the reference electrification characteristic (including both the reference electrification characteristic set by the method of the first embodiment and the reference electrification characteristic corrected by the method of the second embodiment), it is determined whether the electrification state of the EHC 13 is normal or abnormal, i.e., the abnormal electrification of the EHC 13 is determined. Concretely, in the third embodiment, the ECU 70 sets the permissible resistance range based on the reference electrification characteristic, and determines that the electrification of the EHC 13 is abnormal when the actual electrification characteristic (hereinafter referred to as "measured electrification characteristic") becomes out of the permissible resistance range.

The permissible resistance range is the range for determining whether or not the actual electrification resistance value of the EHC 13 is the permissible value for the reference electrification characteristic. Concretely, the permissible resistance range is defined by a permissible upper limit electrification resistance (hereinafter referred to as "permissible range upper limit") and a permissible lower limit electrification resistance (hereinafter referred to as "permissible range lower limit").

In one example (hereinafter referred to as "first example"), the ECU 70 sets the permissible range upper limit by adding a predetermined value (hereinafter referred to as "permissible resistance value") to the electrification resistance value of the reference electrification characteristic, and sets the permissible range lower limit by subtracting the permissible resistance value from the electrification resistance value of the reference electrification characteristic. In another example (hereinafter referred to as "second example"), the ECU 70 sets the permissible range upper limit by increasing the electrification resistance value of the reference electrification characteristic by a predetermined rate (hereinafter referred to as "permissible resistance rate"), and sets the permissible range lower limit by decreasing the electrification resistance value of the reference electrification characteristic by the permissible resistance rate. By the second example, the permissible resistance range can be set in consideration of the large or small electrification resistance value.

Figure 11:
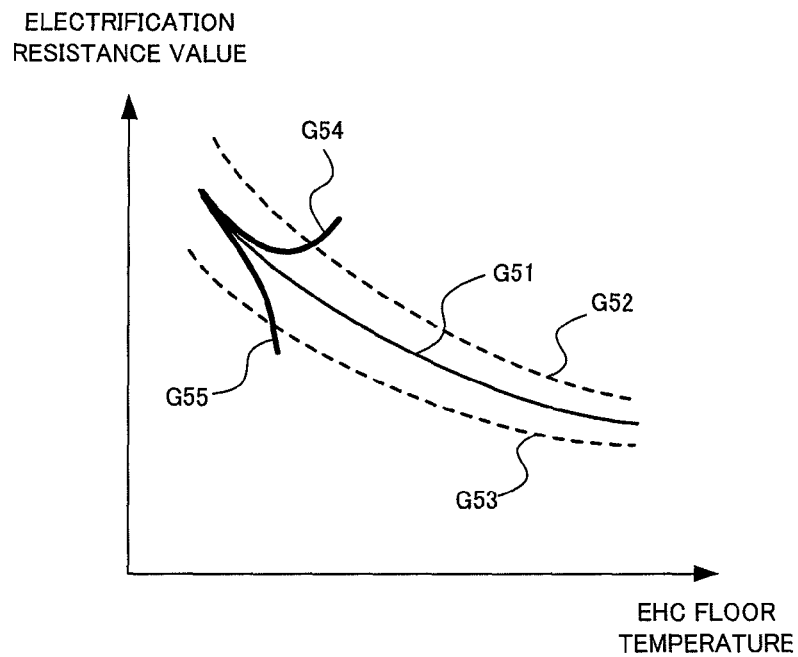
FIG. 11 is a diagram for concretely explaining a method of determining abnormal electrification of EHC in a third embodiment.

FIG. 11 is a diagram showing the concrete example of the method of determining the abnormal electrification of the EHC 13 in the third embodiment. In FIG. 11, the horizontal axis indicates the EHC floor temperature, and the vertical axis indicates the electrification resistance value. The graph G51 illustrates one example of the reference electrification characteristic, the graph G52 illustrates one example of the permissible range upper limit, and the graph G53 illustrates one example of the permissible range lower limit. The reference electrification characteristic G51 is the electrification characteristic set by the method of the first embodiment, or the electrification characteristic obtained by correcting the electrification characteristic set by the method of the first embodiment by the method of the second embodiment. The permissible range upper limit G52 and the permissible range lower limit G53 are set by the method of the first or the second example, based on the reference electrification characteristic G51. The ECU 70 determines the abnormal electrification of the EHC 13 by using the permissible resistance range defined by the permissible range upper limit G52 and the permissible range lower limit G53.

For example, when the actual electrification resistance value of the EHC 13 suddenly increases according to the EHC floor temperature as shown by the graph G54, the ECU 70 determines that the electrification of the EHC 13 is abnormal because the electrification resistance value becomes higher than the permissible range upper limit G52. For example, when the actual electrification resistance value of the EHC 13 suddenly decreases according to the EHC floor temperature as shown by the graph G55, the ECU 70 determines that the electrification of the EHC 13 is abnormal because the electrification resistance value becomes lower than the permissible range upper limit G53. When the ECU 70 determines that the electrification of the EHC 13 is abnormal, it stops the electrification of the EHC 13.

Further, in the third embodiment, the ECU 70 corrects the permissible resistance range in accordance with the electrification condition at the time of starting the electrification of the EHC 13. Concretely, the ECU 70 corrects the permissible range lower limit set by the first or the second example to the lower resistance side, based on the parameter (factor) affecting the electrification characteristic of the EHC 13. Such a parameter will be hereinafter referred to as "permissible range setting parameter". Specifically, as the permissible range setting parameter, the EHC floor temperature at the time of starting the electrification, the supplied power to the EHC 13 at the time of starting the electrification and the temperature dispersion inside the EHC 13 at the time of starting the electrification are used. Namely, the parameters similar to the above-mentioned electrification characteristic setting parameters are used as the permissible range setting parameters.

For example, the ECU 70 corrects the permissible range lower limit to the lower resistance side as the EHC floor temperature at the time of starting the electrification is lower, corrects the permissible range lower limit to the lower resistance side as the supplied power at the time of starting the electrification is larger, or corrects the permissible range lower limit to the lower resistance side as the temperature dispersion at the time of starting the electrification is larger. This is because, when the EHC floor temperature at the time of starting the electrification is low or the supplied power to the EHC 13 at the time of starting the electrification is large, the temperature dispersion of the EHC floor temperature becomes large due to the ununiformity of the current distribution inside the EHC 13, and therefore the electrification resistance value of relatively low value tends to be detected.

Specifically, when the method of the first example is used, the ECU 70 sets the permissible range lower limit by the permissible resistance value corrected in accordance with the permissible range setting parameters. On the other hand, when the method of the second example is used, the ECU 70 sets the permissible range lower limit by the permissible range rate corrected in accordance with the permissible range setting parameters. More specifically, the ECU 70 corrects the permissible resistance value or the permissible resistance rate in accordance with the EHC floor temperature, the supplied power and the temperature dispersion at the time of starting the electrification. Concretely, the ECU 70 corrects the permissible resistance value or the permissible resistance rate to be larger as the EHC floor temperature is lower, and/or the supplied power is larger, and/or the temperature dispersion is larger. In either case where the method of the first example is used or the method of the second example is used, the ECU 70 does not correct the permissible range upper limit. Namely, the ECU 70 sets the permissible range upper limit by the original permissible resistance value or the original permissible resistance rate.

Figure 12:
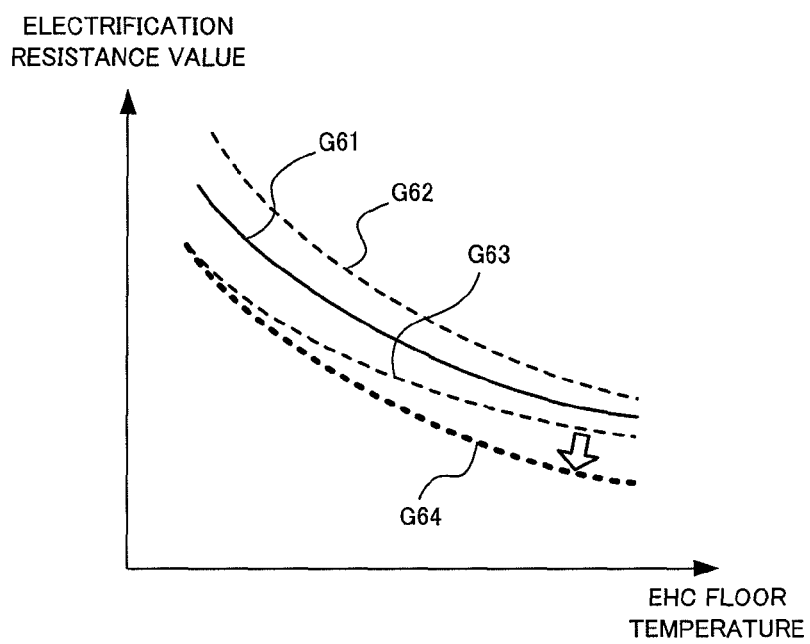
FIG. 12 is a diagram for concretely explaining a method of correcting a permissible resistance range in the third embodiment.

FIG. 12 is a diagram showing a concrete example of the method of correcting the permissible resistance range in the third embodiment. In FIG. 12, the horizontal axis indicates the EHC floor temperature, and the vertical axis indicates the electrification resistance value. The graph G61 illustrates an example of the reference electrification characteristic, the graph G62 illustrates an example of the permissible range upper limit, and the graph G63 illustrates an example of the permissible range lower limit. The permissible range upper limit G62 and the permissible range lower limit G63 are set by the method of the first example or the second example. It is noted that the permissible range lower limit G63 is the permissible range lower limit which is not corrected.

On the other hand, the graph G64 illustrates an example of the permissible range lower limit after correcting the permissible range lower limit G63 in accordance with the permissible range setting parameters. In this case, the permissible range lower limit G64 is corrected to the lower resistance side than the permissible range lower limit G63. The ECU 70 determines that the electrification of the EHC 13 is abnormal by using permissible resistance range defined by the permissible range lower limit G64 after the above correction and the permissible range upper limit G62.

Next, with reference to FIG. 13, the process executed in the third embodiment will be concretely described. FIG. 13 is a flowchart showing the process in the third embodiment. This process is executed to determine the abnormality of the electrification of the EHC 13. This process is repeatedly executed in a predetermined cycle.

First, in step S301, the ECU 70 determines whether or not the EHC electrification request exists. Since the process of step S301 is the same as the process of the above-described step S101, the detailed description thereof will be omitted. The process goes to step S302 if the EHC electrification request exists (step S301; Yes), and the process ends if the EHC electrification request does not exist (step S301; No).

In step S302, it is determined whether or not the reference electrification characteristic has been set. Namely, it is determined whether or not the reference electrification characteristic set by the method of the first embodiment or the reference electrification characteristic obtained by correcting the electrification characteristic set by the method of the first embodiment by the method of the second embodiment exists. The process goes to step S303 and S306 if the reference electrification characteristic has been set (step S302; Yes), and the process ends if the reference electrification characteristic has not been set (step S302; No).

In step S303, the ECU 70 obtains the reference electrification characteristic already set. At that time, the ECU 70 also obtains the permissible resistance value or the permissible resistance rate. Then, the process goes to step S304. In step S304, the ECU 70 obtains the permissible range setting parameters used for setting the permissible resistance range. Concretely, the ECU 70 obtains the EHC floor temperature at the time of starting the electrification, the supplied power to the EHC 13 at the time of starting the electrification and the temperature dispersion inside the EHC 13 at the time of starting the electrification, as the permissible range setting parameters. Then, the process goes to step S305.

In step S305, the ECU 70 sets the permissible resistance range based on the reference electrification characteristic, the permissible resistance value or the permissible resistance rate, and the permissible range setting parameters obtained in steps S303 and S304. For example, the ECU 70 sets the permissible resistance range as follows. First, the ECU 70 obtains the permissible range upper limit and the permissible range lower limit by applying the permissible resistance value or the permissible resistance rate to the reference electrification characteristic. Namely, the ECU 70 sets the permissible range upper limit and the permissible range lower limit by the method of the first example or the second example. Next, the ECU 70 corrects the permissible resistance value or the permissible resistance rate in accordance with the permissible range setting parameters. Concretely, the ECU 70 corrects the permissible resistance value or the permissible resistance rate by using the map in which the permissible resistance value or the permissible resistance rate after the correction is associated with the permissible range setting parameters, or the map in which the correction amount for correcting the permissible resistance value or the permissible resistance rate is associated with the permissible range setting parameters. Next, the ECU 70 obtains the permissible range lower limit by the permissible resistance value or the permissible resistance rate after the correction. Concretely, the ECU 70 obtains the permissible range lower limit by applying the permissible resistance value or the permissible resistance rate after the correction to the reference electrification characteristic, or obtains the permissible range lower limit by applying the permissible resistance value or the permissible resistance rate after the correction to the permissible range lower limit which is not corrected. In this way, the permissible resistance range is set by the permissible range lower limit thus corrected and the permissible range upper limit. Then, the process goes to step S307.

The process of step S306 is executed in parallel with the above steps S303 to S305. In step S306, the ECU 70 obtains the EHC floor temperature and the electrification resistance value. In this case, the ECU 70 obtains the EHC floor temperature detected by the floor temperature sensor 208, or estimates the EHC floor temperature by using predetermined parameters. Also, the ECU 70 calculates the electrification resistance value based on the current value and the voltage value at the time when the EHC 13 is electrified. Then, the process goes to step S307.

In step S307, the ECU 70 determines whether or not the measured electrification characteristic, determined by the EHC floor temperature and the electrification resistance value obtained in step S306, is out of the permissible resistance range set in step S305. Specifically, the ECU 70 first obtains the electrification resistance value corresponding to the EHC floor temperature obtained in step S306 from the permissible range upper limit and the permissible range lower limit, i.e., obtains the upper limit electrification resistance value and the lower limit electrification resistance value. Then, the ECU 70 determines whether or not the electrification resistance value obtained in step S306 is out of the range defined by the upper limit electrification resistance value and the lower limit electrification resistance value thus obtained.

If the measured electrification characteristic is out of the permissible resistance range (step S307; Yes), the process goes to step S308. In step S308, the ECU 70 determines that the electrification state of the EHC 13 is abnormal, and the process ends. In this case, the ECU 70 stops the electrification of the EHC 13. On the other hand, if the measured electrification characteristic is within the permissible resistance range (step S307; No), the process goes to step S309. In step S309, the ECU 70 determines that the electrification state of the EHC 13 is normal, and the process ends. In this case, the ECU 70 continues the electrification of the EHC 13.

According to the third embodiment described above, by using the permissible resistance range set based on the reference electrification characteristic determined in the embodiments described above, determining the abnormal electrification of the EHC 13 can be accurately performed. In the third embodiment, since the permissible resistance range is set in consideration of the electrification condition at the time of starting the electrification, determining the abnormal electrification of the EHC 13 can be performed further accurately. Therefore, the abnormal electrification of the EHC 13 can be detected at an early state.

The modifications of the third embodiment will be described below.

In the above description, an example is shown in which all the EHC floor temperature at the time of starting the electrification, the supplied power to the EHC 13 at the time of starting the electrification and the temperature dispersion inside the EHC 13 at the time of starting the electrification are used as the permissible range setting parameters. However, the present invention is not limited to this. Namely, the present invention is not limited to setting the permissible resistance range based on all the EHC floor temperature, the supplied power and the temperature dispersion. In another example, the ECU 70 may correct the permissible range lower limit of the permissible resistance range by using any two or only one of the EHC floor temperature, the supplied power and the temperature dispersion.

Further, in the above description, an example is shown in which the permissible resistance range defined by the EHC floor temperature is used (see. FIGS. 11 and 12). However, the permissible resistance range defined by the supplied energy to the EHC 13 or the defined by the electrification time to the EHC 13, instead of the EHC floor temperature, may be used. In this case, the permissible resistance range may be set based on the reference electrification characteristic defined by the supplied energy or the electrification time, by the same method as the above-described method. If the permissible resistance range is used, the abnormal electrification of the EHC 13 can be determined by determining whether or not the measured electrification characteristic defined by the supplied energy or the electrification time is out of the permissible resistance range. Namely, the abnormal electrification of the EHC 13 may be determined based on the electrification resistance value in accordance with the supplied energy or the electrification time.

In the second embodiment, it is described that the reference electrification characteristic is corrected when the measured resistance value is smaller than the reference resistance value. However, when it is determined that the measured resistance value is smaller than the reference resistance value, whether or not the measured electrification characteristic of the EHC 13 is out of the permissible resistance range may be further determined, and if the measured electrification characteristic is out of the permissible resistance value, the electrification of the EHC 13 may be determined to be abnormal, without correcting the reference electrification characteristic. Namely, the correction of the reference electrification characteristic may be performed only when the measured electrification characteristic of the EHC 13 is within the permissible resistance range, i.e., only when the electrification condition of the EHC 13 is determined to be normal.

Modified Example

The application of the present invention is not limited to a normal hybrid vehicle, and the present invention may be applied to a plug-in hybrid vehicle. Also, the application of the present invention is not limited to the hybrid vehicle, and the present invention may be applied to a vehicle other than the hybrid vehicle.

DESCRIPTION OF REFERENCE NUMBERS

1 Engine
12 Exhaust Passage
13 EHC (Electrically Heated Catalyst)
13a EHC Carrier
13b Retention Mat
13d Positive Electrode
13e Negative Electrode
70 ECU
100 Hybrid Vehicle

The invention claimed is:
1. An exhaust gas purifying device for an internal combustion engine, comprising:
 an electrically heated catalyst which is provided on an exhaust passage of the internal combustion engine, which purifies the exhaust gas drawn to the exhaust passage, and which is warmed by electrification;
 an electrification characteristic setting unit which set an electrification characteristic indicating a characteristic of an electrification resistance value in the electrically heated catalyst, in accordance with an electrification condition at a time of starting the electrification of the electrically heated catalyst;

a unit which performs an abnormality determination or an electrification control for the electrically heated catalyst, based on the electrification characteristic set by the electrification characteristic setting unit;

a permissible resistance range setting unit which sets a permissible resistance range for determining an actual electrification characteristic of the electrically heated catalyst, based on the electrification characteristic set by the electrification characteristic setting unit; and an abnormal electrification determining unit which obtains the actual electrification characteristic of the electrically heated catalyst, and determines the abnormal electrification of the electrically heated catalyst when the actual electrification characteristic becomes out of the permissible resistance range, wherein the permissible resistance range setting unit sets the permissible resistance range in accordance with the electrification condition to the electrically heated catalyst at the time of starting the electrification.

2. The exhaust gas purifying device for an internal combustion engine according to claim 1, wherein the electrification characteristic setting unit obtains an actual electrification resistance value of the electrically heated catalyst, and corrects the electrification characteristic when the actual electrification resistance value is lower than the electrification resistance value obtained from the electrification characteristic set in accordance with the electrification condition at the time of starting the electrification.

3. The exhaust gas purifying device for an internal combustion engine according to claim 1, further comprising a unit which sets the electrification resistance value for determining whether or not the electrically heated catalyst reaches a target temperature, based on the electrification characteristic set by the electrification characteristic setting unit.

4. The exhaust gas purifying device for an internal combustion engine according to claim 1, wherein at least one of temperature of the electrically heated catalyst at the time of starting the electrification, supplied power to the electrically heated catalyst at the time of starting the electrification and temperature dispersion inside the electrically heated catalyst at the time of starting the electrification is used as the electrification condition at the time of starting the electrification.

5. The exhaust gas purifying device for an internal combustion engine according to claim 1, wherein the electrification characteristic is expressed by a relation of any one of the temperature of the electrically heated catalyst, supplied energy to the electrically heated catalyst and an electrification time to the electrically heated catalyst, with respect to the electrification resistance value.

* * * * *